(No Model.)
B. DU B. SMOCK.
MEANS FOR SUPPORTING ELECTRIC WIRES.
No. 601,357. Patented Mar. 29, 1898.
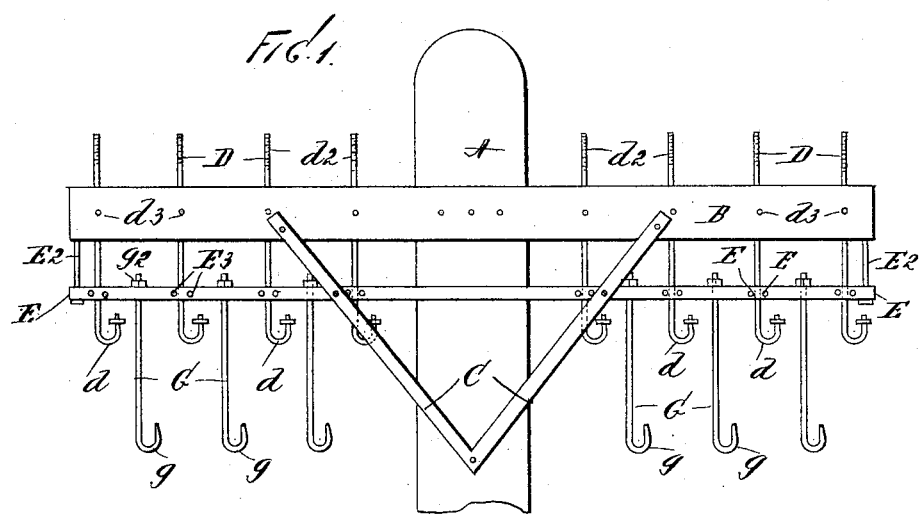
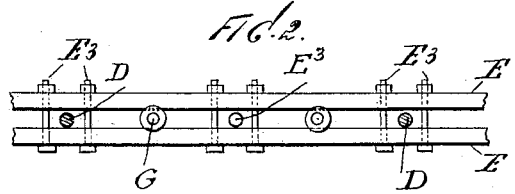
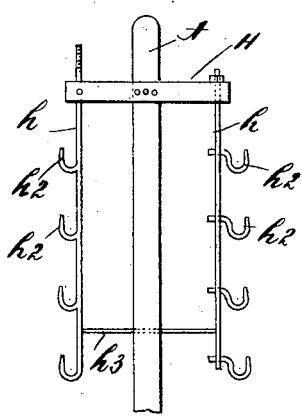 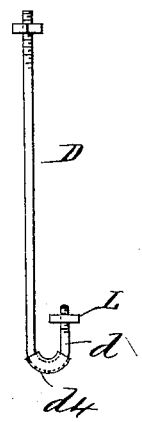 
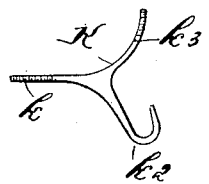
WITNESSES
INVENTOR
Benjamin Du B. Smock
BY
Edgar Tate & Co
ATTORNEYS

UNITED STATES PATENT OFFICE.

BENJAMIN DU BOIS SMOCK, OF WICKATUNK, NEW JERSEY.

MEANS FOR SUPPORTING ELECTRIC WIRES.

SPECIFICATION forming part of Letters Patent No. 601,357, dated March 29, 1898.

Application filed February 10, 1897. Serial No. 622,799. (No model.)

*To all whom it may concern:*

Be it known that I, BENJAMIN DU BOIS SMOCK, a citizen of the United States, residing at Wickatunk, in the county of Monmouth and State of New Jersey, have invented certain new and useful Improvements in Means for Supporting Electric Wires, of which the following is a full and complete specification, such as will enable those skilled in the art to which it appertains to make and use the same.

This invention relates to certain new and useful improvements in means for supporting electric wires; and the object thereof is to provide improved devices of this class which are adapted to be connected with a pole or any other suitable support, so as to increase the number of wires which may be carried by or suspended from said pole or support; and with this and other objects in view the invention consists in the construction, combination, and arrangement of parts hereinafter described and claimed.

The invention is fully disclosed in the following specification, of which the accompanying drawings form a part, in which the separate parts of my improvement are designated by letters of reference in each of the views, and in which—

Figure 1 is a view of the upper portion of a pole provided with the improved means which I employ for connecting electric wires therewith; Fig. 2, a plan view of a part of said device; Fig. 3, a view similar to Fig. 1, showing a modified form of construction; Figs. 4 and 5, side elevations of devices which I employ for suspending or supporting the wires, and Fig. 6 a perspective view of a nut which I employ.

In the drawings forming part of this specification I have shown at A an ordinary pole for electric or telegraph wires, and in the practice of my invention I secure to said pole, near the top thereof, a cross-bar B, each end of which is braced by bars C, the lower ends of which are connected with the pole A and the upper ends with the ends of the bar B, and in practice I also pass vertically through the bar B rods or hangers D, any desired number of which may be employed, but eight of which are shown, four on each side of the pole A. Each rod or hanger D is provided at its lower end with a hook $d$, and the upper end thereof is preferably screw-threaded, as shown at $d^2$, and said rods or hangers may be supported in said bar by nuts or burs connected with the screw-threaded ends thereof, or they may be secured in said bar by pins, nails, or bolts $d^3$, as shown in Fig. 1.

Supported below the bar B are horizontal bars E, which are connected with the bar B by hangers $E^2$, and in practice the rods D pass between the bars E and are held in proper position by bolts $E^3$, as shown in Figs. 1 and 2, and suspended from the parallel bars E are supplemental hangers G, which also consist of rods and the lower ends of which are provided with hooks $g$, and the rods which constitute the supplemental hangers G are suspended from the bars E by nuts $g^2$.

In Fig. 3 I have shown a modification in which the pole A is provided with a cross-bar H, with which are connected two depending rods or hangers $h$, each of which is provided with hooks $h^2$, and the lower ends of the hangers or rods $h$ are connected by a cross-rod $h^3$, and a detail of one of the rods or hangers D is shown in Fig. 4 and a modified form of hanger is shown in Fig. 5 at K, this device being provided with a screw-threaded shank $k$, by which it may be connected with the bar B and with a depending kook $k^2$, and said hanger is also provided with an upwardly-directed arm $k^3$, by means of which a protecting-nut L (shown in Fig. 3) may be used.
This nut L is also used on the hooks $d$ at the lower ends of the hangers or rods D, and it may also be used on the hooks $g$ at the lower ends of the rods or hangers G, the object thereof being to retain the wires which are suspended from said hooks in position; and in connection with these hangers or supports I may also employ the insulator shown and described in Patent No. 574,828, granted to me January 5, 1897, said insulator being adapted to be suspended from the hooks $d$, $g$, $h^2$, and $k^2$, herein shown and described. It will be apparent, however, that any desired form of insulator may be connected with these hooks, the object of this invention being to provide suitable hangers or supports by means of which a much larger number of wires may be suspended from or connected with a single pole than is the case with devices of this class as usually constructed.

The hooks $d$ on the rods or hangers D may also be provided with insulating material, as shown at $d^4$ in Fig. 4, and similar insulating material may also be applied to the hooks $g$, $h^2$, and $k^2$, and the upper ends of the rods or hangers D, which are screw-threaded, as described, and which pass through the bar B, may also be provided with insulators through which the wires may be passed or with which wires may be connected in any desired manner.

My invention is perfectly adapted to accomplish the object for which it is intended, and is also comparatively inexpensive, and it will be apparent that changes in and modifications of the construction herein described may be made without departing from the spirit of my invention or sacrificing its advantages.

Having fully described my invention, I claim as new and desire to secure by Letters Patent—

The combination with a suitable support of a hanger, comprising a bar and two parallel bars suspended therefrom, line-supports secured to said bars and each consisting of a rod provided at one end with a hook integral therewith and covered with insulating material and the end of said hook being screw-threaded and provided with a nut, the opposite end of said rod being adapted to pass through openings in said bars and being also provided with a nut, substantially as and for the purpose described.

In testimony that I claim the foregoing as my invention I have signed my name, in presence of the subscribing witnesses, this 8th day of February, 1897.

BENJAMIN DU BOIS SMOCK.

Witnesses:
CHARLES A. GERAU,
HERBERT O. HALSEY.